(12) United States Patent
Huang et al.

(10) Patent No.: US 11,460,949 B2
(45) Date of Patent: Oct. 4, 2022

(54) ELECTRONIC DEVICE

(71) Applicant: Au Optronics Corporation, Hsinchu (TW)

(72) Inventors: Chao-Kun Huang, Hsinchu (TW); Bo-Ru Jian, Hsinchu (TW); Kuo-Hsuan Huang, Hsinchu (TW)

(73) Assignee: Au Optronics Corporation, Hsinchu (TW)

( * ) Notice: Subject to any disclaimer, the term of this patent is extended or adjusted under 35 U.S.C. 154(b) by 0 days.

(21) Appl. No.: 17/389,386

(22) Filed: Jul. 30, 2021

(65) Prior Publication Data

US 2022/0147216 A1    May 12, 2022

Related U.S. Application Data

(60) Provisional application No. 63/110,422, filed on Nov. 6, 2020.

(30) Foreign Application Priority Data

May 11, 2021    (TW) .................................. 110116852

(51) Int. Cl.
*G06F 3/041*    (2006.01)
*G06F 3/044*    (2006.01)

(52) U.S. Cl.
CPC ........ *G06F 3/04164* (2019.05); *G06F 3/0446* (2019.05); *G06F 3/0412* (2013.01); *G06F 2203/04111* (2013.01)

(58) Field of Classification Search
CPC .. G06F 3/04164; G06F 3/0446; G06F 3/0412; G06F 2203/04111
See application file for complete search history.

(56) References Cited

U.S. PATENT DOCUMENTS

| 10,013,097 B2* | 7/2018 | Choung | ................ G06F 3/0443 |
| 10,234,980 B2* | 3/2019 | Seong | ................... G06F 3/0445 |
| 10,599,241 B2* | 3/2020 | Li | ......................... G06F 3/0446 |

(Continued)

FOREIGN PATENT DOCUMENTS

| CN | 205427804 | 8/2016 |
| CN | 105094401 | 8/2018 |

(Continued)

*Primary Examiner* — Amy Onyekaba
(74) *Attorney, Agent, or Firm* — JCIPRNET

(57) ABSTRACT

An electronic device, including a substrate, first electrodes, second electrodes, and peripheral wiring pairs, is provided. The substrate has a first peripheral area, a working area, and a second peripheral area arranged along a first direction. The first electrodes are disposed in the working area, structurally separated from each other, and arranged along a second direction. The second electrodes are disposed in the working area, structurally separated from each other, and arranged along the first direction. Each peripheral wiring pair includes first and second peripheral wirings respectively belonging to first and second conductive layers. One of the first and second peripheral wirings is disposed in one of the first and second peripheral areas. Other one of the first and second peripheral wirings is disposed in other one of the first and second peripheral areas. The first and second peripheral wirings are electrically connected to the same first electrode.

7 Claims, 2 Drawing Sheets

(56) References Cited

U.S. PATENT DOCUMENTS

| | | | | |
|---|---|---|---|---|
| 10,754,482 B2* | 8/2020 | Cho | .................... | H01L 27/3276 |
| 10,928,964 B2* | 2/2021 | Kim | .................... | G01R 27/2605 |
| 11,029,776 B2* | 6/2021 | Fang | .................... | G06F 3/0445 |
| 11,073,940 B2* | 7/2021 | Cui | .................... | G06F 3/0443 |
| 11,144,168 B1* | 10/2021 | Lin | ..................... | G06F 3/0448 |
| 2011/0157086 A1* | 6/2011 | Ozeki | .................. | G06F 3/0445 |
| | | | | 345/174 |
| 2013/0081869 A1* | 4/2013 | Kim | ..................... | G06F 3/0443 |
| | | | | 29/825 |
| 2015/0253882 A1* | 9/2015 | Lee | ..................... | G06F 3/0446 |
| | | | | 345/173 |
| 2015/0293629 A1* | 10/2015 | Ryu | .................... | G06F 3/0448 |
| | | | | 345/174 |
| 2016/0139708 A1* | 5/2016 | Tseng | .................. | G06F 3/0418 |
| | | | | 345/174 |
| 2017/0185199 A1* | 6/2017 | Xie | ...................... | G06F 3/047 |
| 2019/0012026 A1* | 1/2019 | Li | ........................ | G06F 3/0446 |
| 2019/0155445 A1* | 5/2019 | Seong | .................. | G06F 3/0412 |
| 2019/0339816 A1* | 11/2019 | Hsu | ..................... | G06F 3/0448 |
| 2020/0110498 A1* | 4/2020 | Lee | ..................... | G06F 3/04164 |
| 2020/0186631 A1* | 6/2020 | Ye | ........................ | G06F 1/1643 |
| 2020/0357857 A1* | 11/2020 | Park | ..................... | G06F 3/047 |
| 2021/0026513 A1* | 1/2021 | Lee | ..................... | G06F 3/0445 |
| 2021/0048936 A1* | 2/2021 | Cui | ..................... | G06F 3/04166 |

FOREIGN PATENT DOCUMENTS

| | | |
|---|---|---|
| CN | 108897445 | 11/2018 |
| CN | 106647071 | 11/2019 |
| CN | 110515505 | 11/2019 |
| WO | 2020191696 | 10/2020 |

\* cited by examiner

ELECTRONIC DEVICE

CROSS-REFERENCE TO RELATED APPLICATION

This application claims the priority benefit of U.S. Provisional Application No. 63/110,422, filed on Nov. 6, 2020 and Taiwan application serial no. 110116852, filed on May 11, 2021. The entirety of each of the above-mentioned patent applications is hereby incorporated by reference herein and made a part of this specification.

BACKGROUND

Technical Field

The disclosure relates to an electronic device.

Description of Related Art

With the development of technology, electronic blackboards with display and touch functions are gradually being applied in teaching situations to replace traditional blackboards. The large-scale electronic blackboard is formed by splicing multiple touch display devices. In order to reduce the joint area between the touch display devices, each touch display device needs to have narrow borders. Generally speaking, multiple touch electrodes of the touch display device need to be electrically connected to multiple pads below through multiple peripheral wirings disposed on the left and right sides, so that a driver chip can drive the touch electrodes through the pads and the peripheral wirings. However, the configuration of the peripheral wirings makes it difficult to reduce the left and right borders of the touch display device.

SUMMARY

The disclosure provides an electronic device with good performance.

The electronic device of the disclosure includes a substrate, multiple first electrodes, multiple second electrodes, multiple peripheral wiring pairs, and an insulating layer. The substrate has a first peripheral area, a working area, and a second peripheral area. The first peripheral area, the working area, and the second peripheral area are arranged along a first direction, and the working area is located between the first peripheral area and the second peripheral area. The first electrodes are disposed in the working area, are structurally separated from each other, and are arranged along a second direction. The first direction and the second direction are interlaced. The second electrodes are disposed in the working area, are structurally separated from each other, and are arranged along the first direction. Each peripheral wiring pair includes a first peripheral wiring and a second peripheral wiring respectively belonging to a first conductive layer and a second conductive layer. One of the first peripheral wiring and the second peripheral wiring is disposed in one of the first peripheral area and the second peripheral area, other one of the first peripheral wiring and the second peripheral wiring is disposed in other one of the first peripheral area and the second peripheral area, and the first peripheral wiring and the second peripheral wiring are electrically connected to a same first electrode. The insulating layer is disposed between the first conductive layer and the second conductive layer. Multiple first peripheral wirings and multiple second peripheral wirings of the peripheral wiring pairs are alternately arranged in the first peripheral area.

In an embodiment of the disclosure, another multiple first peripheral wirings and another multiple second peripheral wirings of the peripheral wiring pairs are alternately arranged in the second peripheral area.

In an embodiment of the disclosure, a first peripheral wiring and a second peripheral wiring of two different peripheral wiring pairs are respectively electrically connected to two adjacent first electrodes and are located in the first peripheral area. The first peripheral wiring and the second peripheral wiring of the two peripheral wiring pairs located in the first peripheral area at least partially overlap.

In an embodiment of the disclosure, another first peripheral wiring and another second peripheral wiring of the two different peripheral wiring pairs are respectively electrically connected to the two adjacent first electrodes and are located in the second peripheral area. The another first peripheral wiring and the another second peripheral wiring of the two different peripheral wiring pairs located in the second peripheral area at least partially overlap.

In an embodiment of the disclosure, thicknesses of the first peripheral wiring and the second peripheral wiring of each peripheral wiring pair are different.

In an embodiment of the disclosure, the first electrodes belong to the first conductive layer. The insulating layer is disposed on the first conductive layer and has multiple contact windows. Each first electrode is electrically connected to the second peripheral wiring of a corresponding peripheral wiring pair through a contact window of the insulating layer. The contact windows of the insulating layer include multiple first contact windows and multiple second contact windows respectively located in the first peripheral area and the second peripheral area. The first contact windows correspond to odd-numbered first electrodes, and the second contact windows correspond to even-numbered first electrodes.

In an embodiment of the disclosure, the substrate further has a third peripheral area located beside the first peripheral area, the working area, and the second peripheral area. The electronic device further includes multiple pads disposed in the third peripheral area. Each pad includes a first conductive pattern, a second conductive pattern, and a metal oxide pattern that are stacked in order and electrically connected to each other. The first conductive pattern and the second conductive pattern are structurally separated from the peripheral wirings. The first conductive pattern and the second conductive pattern of each pad are electrically connected to the first peripheral wiring or the second peripheral wiring of a corresponding peripheral wiring pair through the metal oxide pattern.

DETAILED DESCRIPTION OF DISCLOSED EMBODIMENTS

Figure 1:
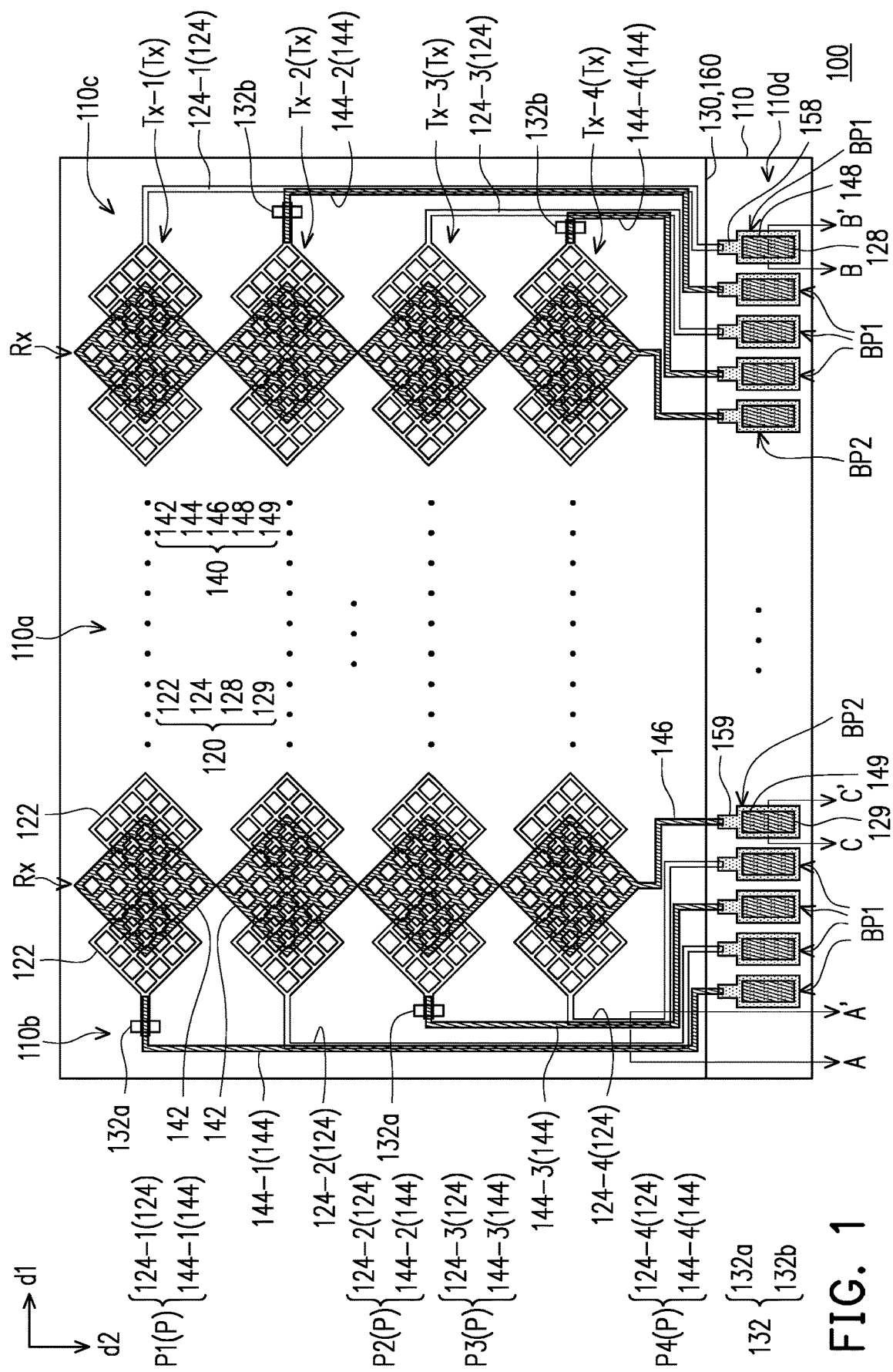
FIG. 1 is a schematic top view of an electronic device 100 according to an embodiment of the disclosure.

Reference will now be made in detail to the exemplary embodiments of the disclosure, and examples of the exemplary embodiments are illustrated in the accompanying drawings. Whenever possible, the same reference numerals are used in the drawings and description to indicate the same or similar parts.

It should be understood that when an element such as a layer, film, region, or substrate is referred to as being "on" or "connected to" another element, the layer, film, region, or substrate may be directly on or connected to the another element or there may be an intermediate element. In contrast, when an element is referred to as being "directly on" or "directly connected to" another element, there is no intermediate element. As used herein, "connection" may refer to physical and/or electrical connection. Furthermore, for "electrical connection" or "coupling", there may be another element between two elements.

As used herein, "about", "approximately", or "substantially" includes a stated value and an average value within an acceptable range of deviation from a specific value determined by persons skilled in the art, while considering specific amounts of the measurement in question and measurement-related errors (that is, the limitation of the measurement system). For example, "about" may mean within one or more standard deviations or within ±30%, ±20%, ±10%, or ±5% of the stated value. Furthermore, a more acceptable range of deviation or standard deviation may be selected for "about", "approximately", or "substantially" used herein according to optical properties, etching properties, or other properties, instead of using one standard deviation for all properties.

Unless otherwise defined, all terms (including technical and scientific terms) used herein have the same meaning as commonly understood by persons skilled in the art to which the disclosure belongs. It will be further understood that terms such as those defined in commonly used dictionaries should be interpreted as having meanings consistent with their meanings in the context of related technologies and the disclosure, and will not be interpreted as having idealized or overly formal meanings, unless explicitly defined herein.

FIG. 1 is a schematic top view of an electronic device 100 according to an embodiment of the disclosure.

Figure 2:
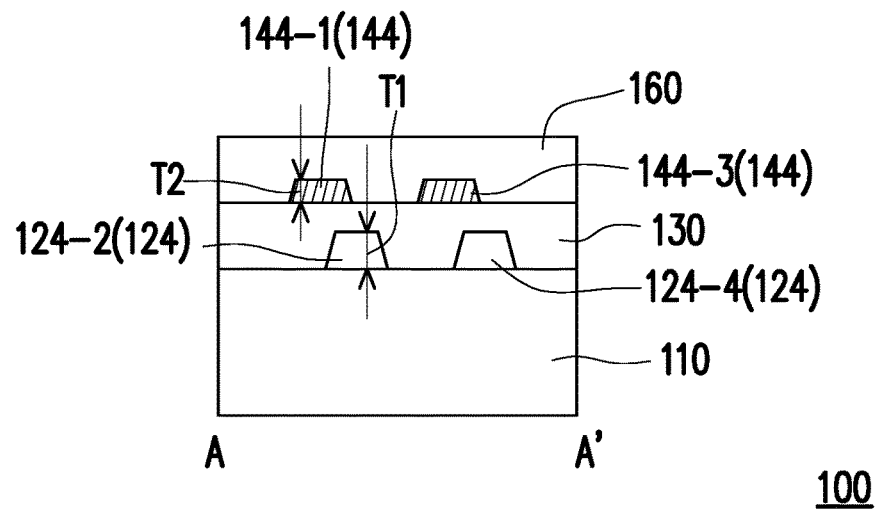
FIG. 2 is a schematic cross-sectional view of the electronic device 100 according to an embodiment of the disclosure.

FIG. 2 is a schematic cross-sectional view of the electronic device 100 according to an embodiment of the disclosure. FIG. 2 corresponds to a section line A-A' of FIG. 1.

Figure 3:
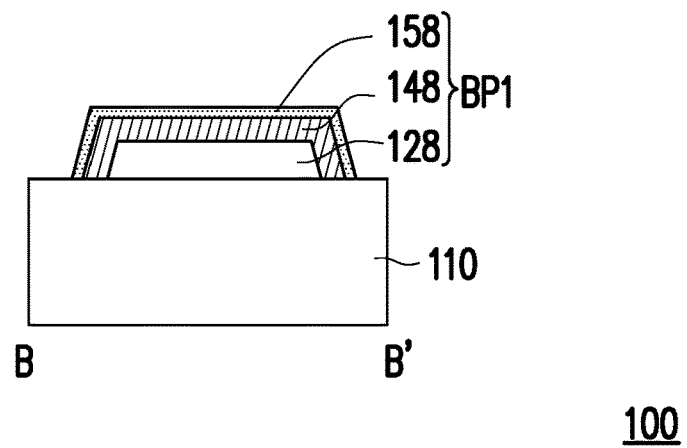
FIG. 3 is a schematic cross-sectional view of the electronic device 100 according to an embodiment of the disclosure.

FIG. 3 is a schematic cross-sectional view of the electronic device 100 according to an embodiment of the disclosure. FIG. 3 corresponds to a section line B-B' of FIG. 1.

Figure 4:
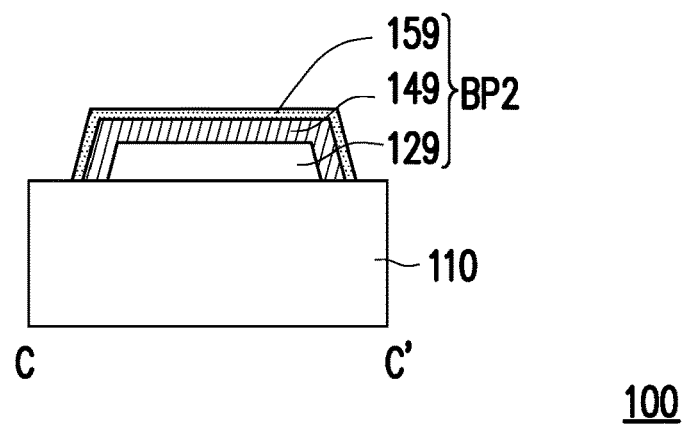
FIG. 4 is a schematic cross-sectional view of the electronic device 100 according to an embodiment of the disclosure.

FIG. 4 is a schematic cross-sectional view of the electronic device 100 according to an embodiment of the disclosure. FIG. 3 corresponds to a section line C-C' of FIG. 1.

Please refer to FIG. 1. The electronic device 100 includes a substrate 110, which has a first peripheral area 110b, a working area 110a, and a second peripheral area 110c. The first peripheral area 110b, the working area 110a, and the second peripheral area 110c are arranged along a first direction d1, and the working area 110a is located between the first peripheral area 110b and the second peripheral area 110c. For example, in the embodiment, the first peripheral area 110b and the second peripheral area 110c may respectively be a left border and a right border of the electronic device 100. In addition, in the embodiment, the substrate 110 further has a third peripheral area 110d, which is located beside the first peripheral area 110b, the working area 110a, and the second peripheral area 110c. For example, in the embodiment, the third peripheral area 110d may be a lower border of the electronic device 100. In the embodiment, the material of the substrate 110 may be glass, quartz, organic polymer, or other applicable materials.

Please refer to FIG. 1. The electronic device 100 further includes multiple first electrodes Tx. The first electrodes Tx are disposed in the working area 110a, are structurally separated from each other, and are arranged along a second direction d2. The first direction d1 and the second direction d2 are interlaced. For example, in the embodiment, the first direction d1 and the second direction d2 may be perpendicular, but the disclosure is not limited thereto.

In the embodiment, each first electrode Tx may include multiple first sensing pads 122 connected in series. Two adjacent first sensing pads 122 are electrically connected to each other. For example, in the embodiment, each first sensing pad 122 may be a first metal mesh, but the disclosure is not limited thereto.

In the embodiment, the first electrodes Tx may selectively belong to a first conductive layer 120. Based on the consideration of conductivity, the material of the first conductive layer 120 is generally a metallic material. However, the disclosure is not limited thereto. In other embodiments, the first conductive layer 120 may also use other conductive materials, such as alloys, nitrides of metallic materials, oxides of metallic materials, oxynitrides of metallic materials, or stacked layers of metallic materials and other conductive materials.

Please refer to FIG. 1. The electronic device 100 further includes multiple second electrodes Rx. The second electrodes Rx are disposed in the working area 110a, are structurally separated from each other, and are arranged along the first direction d1.

In the embodiment, each second electrode Rx may include multiple second sensing pads 142 connected in series. Two adjacent second sensing pads 142 are electrically connected to each other. For example, in the embodiment, each second sensing pad 142 may be a second metal mesh, but the disclosure is not limited thereto.

In the embodiment, the second electrodes Rx may selectively belong to a second conductive layer 140. Based on the consideration of conductivity, the material of the second conductive layer 140 is generally a metallic material. However, the disclosure is not limited thereto. In other embodiments, the second conductive layer 140 may also use other conductive materials, such as alloys, nitrides of metallic materials, oxides of metallic materials, oxynitrides of metallic materials, or stacked layers of metallic materials and other conductive materials.

Please refer to FIG. 1 and FIG. 2. The electronic device 100 further includes an insulating layer 130, which is disposed between the first conductive layer 120 and the second conductive layer 140. The insulating layer 130 is also referred to as a protective layer. The material of the insulating layer 130 may be an inorganic material (for example, silicon oxide, silicon nitride, silicon oxynitride, or a stacked layer of at least two of the foregoing materials), an organic material, or a combination thereof.

Please refer to FIG. 1. The electronic device 100 further includes multiple peripheral wiring pairs P. Each peripheral wiring pair P includes a first peripheral wiring 124 and a second peripheral wiring 144 respectively belonging to the first conductive layer 120 and the second conductive layer 140. One of the first peripheral wiring 124 and the second peripheral wiring 144 is disposed in one of the first peripheral area 110b and the second peripheral area 110c, and other one of the first peripheral wiring 124 and the second peripheral wiring 144 is disposed in other one of the first peripheral area 110b and the second peripheral area 110c, and the first peripheral wiring 124 and the second peripheral wiring 144 are electrically connected to the same first electrode Tx.

In short, two ends of each first electrode Tx are respectively electrically connected to the first peripheral wiring 124 and the second peripheral wiring 144 belonging to different film layers. In this way, the resistivity difference of the peripheral wiring pairs P respectively used to drive the first electrodes Tx may be smaller, thereby achieving impedance balance.

Please refer to FIG. 1. Multiple first peripheral wirings 124 and multiple second peripheral wirings 144 of the peripheral wiring pairs P are alternately arranged in the first peripheral area 110b. In the embodiment, another multiple first peripheral wirings 124 and another multiple second peripheral wirings 144 of the peripheral wiring pairs P are also alternately arranged in the second peripheral area 110c. In particular, the arrangement order of the first peripheral wirings 124 and the second peripheral wirings 144 in the first peripheral area 110b is different from the arrangement order of the another first peripheral wirings 124 and the another second peripheral wirings 144 in the second peripheral area 110c.

For example, in the embodiment, the first electrodes Tx include a first electrode Tx-1, a first electrode Tx-2, a first electrode Tx-3, and a first electrode Tx-4 arranged in order along the second direction d2. A left end of the first electrode Tx-1, a left end of the first electrode Tx-2, a left end of the first electrode Tx-3, and a left end of the first electrode Tx-4 are respectively electrically connected to a second peripheral wiring 144-1, a first peripheral wiring 124-2, a second peripheral wiring 144-3, and a first peripheral wiring 124-4. A right end of the first electrode Tx-1, a right end of the first electrode Tx-2, a right end of the first electrode Tx-3, and a right end of the first electrode Tx-4 are respectively electrically connected to a first peripheral wiring 124-1, a second peripheral wiring 144-2, a first peripheral wiring 124-3, and a second peripheral wiring 144-4. In particular, in the first peripheral area 110b, multiple first peripheral wirings 124 and multiple second peripheral wirings 144 are arranged in the second direction d2 in the order of the second peripheral wiring 144-1, the first peripheral wiring 124-2, the second peripheral wiring 144-3, and the first peripheral wiring 124-4. However, in the second peripheral area 110c, multiple first peripheral wirings 124 and multiple second peripheral wirings 144 are arranged in the second direction d2 in the order of the first peripheral wiring 124-1, the second peripheral wiring 144-2, the first peripheral wiring 124-3, and the second peripheral wiring 144-4.

Please refer to FIG. 1 and FIG. 2. In the embodiment, a first peripheral wiring 124 and a second peripheral wiring 144 of two different peripheral wiring pairs P are respectively electrically connected to two adjacent first electrodes Tx and are both located in the first peripheral area 110b. The first peripheral wiring 124 and the second peripheral wiring 144 of the two different peripheral wiring pairs P both located in the first peripheral area 110b at least partially overlap. Please refer to FIG. 1. Similarly, another first peripheral wiring 124 and another second peripheral wiring 144 of the two different peripheral wiring pairs P are respectively electrically connected to the two adjacent first electrodes Tx and are both located in the second peripheral area 110c. The another first peripheral wiring 124 and the another second peripheral wiring 144 of the two different peripheral wiring pairs P both located in the second peripheral area 110c at least partially overlap.

Please refer to FIG. 1. Multiple peripheral wiring pairs P1, P2, P3, and P4 are respectively electrically connected to the first electrodes Tx-1, Tx-2, Tx-3, and Tx-4. For example, in the embodiment, a first peripheral wiring 124-2 and a second peripheral wiring 144-1 of two different peripheral wiring pairs P1 and P2 are respectively electrically connected to two adjacent first electrodes Tx-2 and Tx-1 and are both located in the first peripheral area 110b. The first peripheral wiring 124-2 and the second peripheral wiring 144-1 of the two different peripheral wiring pairs P1 and P2 both located in the first peripheral area 110b at least partially overlap. Another first peripheral wiring 124-1 and another second peripheral wiring 144-2 of the two different peripheral wiring pairs P1 and P2 are respectively electrically connected to the two adjacent first electrodes Tx-1 and Tx-2 and are both located in the second peripheral area 110c. The another first peripheral wiring 124-1 and the another second peripheral wiring 144-2 of the two different peripheral wiring pairs P1 and P2 both located in the second peripheral area 110c at least partially overlap.

For example, in the embodiment, a first peripheral wiring 124-4 and a second peripheral wiring 144-3 of two different peripheral wiring pairs P3 and P4 are respectively electrically connected to two adjacent first electrodes Tx-4 and Tx-3 and are both located in the first peripheral area 110b. The first peripheral wiring 124-4 and the second peripheral wiring 144-3 of the two different peripheral wiring pairs P3 and P4 both located in the first peripheral area 110b at least partially overlap. Another first peripheral wiring 124-3 and another second peripheral wiring 144-4 of the two different peripheral wiring pairs P3 and P4 are respectively electrically connected to the two adjacent first electrodes Tx-3 and Tx-4 and are both located in the second peripheral area 110c. The another first peripheral wiring 124-3 and the another second peripheral wiring 144-4 of the two different peripheral wiring pairs P3 and P4 in the second peripheral area 110c at least partially overlap.

It is worth mentioning that in the embodiment, the first peripheral wiring 124 and the second peripheral wiring 144 of the two different peripheral wiring pairs P are respectively electrically connected to the two adjacent first electrodes Tx and are located in the same peripheral area. Also, the first peripheral wiring 124 and the second peripheral wiring 144 of the two different peripheral wiring pairs P located in the same peripheral area at least partially overlap. Therefore, the electronic device 100 can not only achieve impedance balance, but also has the advantages of narrow borders (for example, narrow left border and right border).

Please refer to FIG. 1 and FIG. 2. In the embodiment, the thicknesses of the first peripheral wiring 124 and the second peripheral wiring 144 of each peripheral wiring pair P are different. For example, in the embodiment, a thickness T1 of the first peripheral wiring 124 belonging to the first conductive layer 120 may be greater than a thickness T2 of the second peripheral wiring 144 belonging to the second conductive layer 140, but the disclosure is not limited thereto.

Please refer to FIG. 1 and FIG. 2. In the embodiment, the first electrodes Tx belong to the first conductive layer 120. The insulating layer 130 is disposed on the first conductive layer 120 and has multiple contact windows 132. Each first electrode Tx is electrically connected to the second peripheral wiring 144 of the corresponding peripheral wiring pair P through a contact window 132 of the insulating layer 130. In particular, the contact windows 132 of the insulating layer 130 include multiple first contact windows 132a and multiple second contact windows 132b respectively located in the first peripheral area 110b and the second peripheral area 110c. The first contact windows 132a correspond to the odd-numbered first electrodes Tx, and the second contact windows 132b correspond to the even-numbered first electrodes Tx.

Please refer to FIG. 1. For example, in the embodiment, the first electrodes Tx include the 1-st first electrode Tx-1, the 2-nd first electrode Tx-2, the 3-rd first electrode Tx-3, and the 4-th first electrode Tx-4 arranged in order along the second direction d2. The 1-st first electrode Tx-1 is electrically connected to the second peripheral wiring 144-1 of the corresponding peripheral wiring pair P1 through the first contact window 132a located in the first peripheral area 110b. The 3-rd first electrode Tx-3 is electrically connected to the second peripheral wiring 144-3 of the corresponding peripheral wiring pair P3 through the first contact window 132a located in the first peripheral area 110b. The 2-nd first electrode Tx-2 is electrically connected to the second peripheral wiring 144-2 of the corresponding peripheral wiring pair P2 through the second contact window 132b located in the second peripheral area 110c. The 4-th first electrode Tx-4 is electrically connected to the second peripheral wiring 144-4 of the corresponding peripheral wiring pair P4 through the second contact window 132b located in the second peripheral area 110c. In other words, the first contact windows 132a located in the first peripheral area 110b correspond to the odd-numbered 1-st first electrode Tx-1 and 3-rd first electrode Tx-3, and the second contact windows 132b located in the second peripheral area 110c correspond to the even-numbered 2-nd first electrode Tx-2 and 4-th first electrode Tx-4.

Please refer to FIG. 1 and FIG. 3. In the embodiment, the electronic device 100 further includes multiple pads BP1 disposed in the third peripheral area 110d. Each pad BP1 includes a first conductive pattern 128, a second conductive pattern 148, and a metal oxide pattern 158 that are stacked in order and electrically connected to each other. The first conductive pattern 128 and the second conductive pattern 148 are structurally separated from the peripheral wiring pairs P. The first conductive pattern 128 and the second conductive pattern 148 may selectively respectively belong to the first conductive layer 120 and the second conductive layer 140. The first conductive pattern 128 and the second conductive pattern 148 of each pad BP1 are electrically connected to the first peripheral wiring 124 or the second peripheral wiring 144 of the corresponding peripheral wiring pair P through the metal oxide pattern 158, so as to be electrically connected to the first electrode Tx.

Please refer to FIG. 1. In the embodiment, the electronic device 100 further includes multiple peripheral wirings 146, which are respectively electrically connected to the second electrodes Rx. Please refer to FIG. 1 and FIG. 4. In the embodiment, the electronic device 100 further includes multiple pads BP2 disposed in the third peripheral area 110d. Each pad BP2 includes a first conductive pattern 129, a second conductive pattern 149, and a metal oxide pattern 159 that are stacked in order and electrically connected to each other. The first conductive pattern 129 and the second conductive pattern 149 are structurally separated from the peripheral wirings 146. The first conductive pattern 129 and the second conductive pattern 149 may selectively respectively belong to the first conductive layer 120 and the second conductive layer 140. The first conductive pattern 129 and the second conductive pattern 149 of each pad BP2 are electrically connected to the corresponding peripheral wiring 146 through the metal oxide pattern 159, so as to be electrically connected to the second electrode Rx.

Please refer to FIG. 1, FIG. 2, FIG. 3, and FIG. 4. For example, in the embodiment, the electronic device 100 further includes an insulating layer 160 disposed on the second conductive layer 140. The insulating layer 130 covers most portion of the first conductive layer 120 (that is, the first electrodes Tx and most portion of each first peripheral wiring 124), and the insulating layer 130 does not cover the third peripheral area 110d and an end portion of each first peripheral wiring 124 extending to the third peripheral area 110d. The insulating layer 160 covers most portion of the second conductive layer 140 (that is, the second electrodes Rx, most portion of each second peripheral wiring 144, and most portion of each peripheral wiring 146), and the insulating layer 160 does not cover the third peripheral area 110d, an end portion of each first peripheral wiring 124 extending to the third peripheral area 110d, an end portion of each second peripheral wiring 144 extending to the third peripheral area 110d, and an end portion of each peripheral wiring 146 extending to the third peripheral area 110d.

Please refer to FIG. 1 and FIG. 3. The first conductive pattern 128 and the second conductive pattern 148 of each pad BP1 substantially coincide and are in direct contact. The first conductive pattern 128 and the second conductive pattern 148 of each pad BP1 are structurally separated from the corresponding first peripheral wiring 124 or second peripheral wiring 144. Two places of the metal oxide pattern 158 of each pad BP1 respectively directly cover the second conductive pattern 148 and an end portion of the corresponding first peripheral wiring 124 or second peripheral wiring 144. In this way, each pad BP1 may be electrically connected to the corresponding first peripheral wiring 124 or second peripheral wiring 144, so as to be electrically connected to the first electrode Tx through the first peripheral wiring 124 or the second peripheral wiring 144.

Please refer to FIG. 1 and FIG. 4. The first conductive pattern 129 and the second conductive pattern 149 of each pad BP2 substantially coincide and are in direct contact. The first conductive pattern 129 and the second conductive pattern 149 of each pad BP2 are structurally separated from the corresponding peripheral wiring 146. Two places of the metal oxide pattern 159 of each pad BP2 respectively directly cover the second conductive pattern 149 and an end portion of the corresponding peripheral wiring 146. In this way, each pad BP2 may be electrically connected to the corresponding peripheral wiring 146, so as to be electrically connected to the second electrode Rx through the peripheral wiring 146.

In the embodiment, the first electrodes Tx and the second electrodes Rx are, for example, multiple touch electrodes, and the electronic device 100 includes, for example, a touch panel, but the disclosure is not limited thereto.

What is claimed is:
1. An electronic device, comprising:
   a substrate, having a first peripheral area, a working area, and a second peripheral area, wherein the first peripheral area, the working area, and the second peripheral area are arranged along a first direction, and the working area is located between the first peripheral area and the second peripheral area;
   a plurality of first electrodes, disposed in the working area, structurally separated from each other, and arranged along a second direction, wherein the first direction and the second direction are interlaced;

a plurality of second electrodes, disposed in the working area, structurally separated from each other, and arranged along the first direction;
a plurality of peripheral wiring pairs, wherein each of the peripheral wiring pairs comprises a first peripheral wiring and a second peripheral wiring respectively belonging to a first conductive layer and a second conductive layer, one of the first peripheral wiring and the second peripheral wiring is disposed in one of the first peripheral area and the second peripheral area, other one of the first peripheral wiring and the second peripheral wiring is disposed in other one of the first peripheral area and the second peripheral area, and the first peripheral wiring and the second peripheral wiring are electrically connected to a same first electrode; and
an insulating layer, disposed between the first conductive layer and the second conductive layer, wherein
a plurality of first peripheral wirings and a plurality of second peripheral wirings of the peripheral wiring pairs are alternately arranged in the first peripheral area.

2. The electronic device according to claim 1, wherein another plurality of first peripheral wirings and another plurality of second peripheral wirings of the peripheral wiring pairs are alternately arranged in the second peripheral area.

3. The electronic device according to claim 1, wherein a first peripheral wiring and a second peripheral wiring of two different peripheral wiring pairs are respectively electrically connected to two adjacent first electrodes and are located in the first peripheral area, and the first peripheral wiring and the second peripheral wiring of the two different peripheral wiring pairs located in the first peripheral area at least partially overlap.

4. The electronic device according to claim 3, wherein another first peripheral wiring and another second peripheral wiring of the two different peripheral wiring pairs are respectively electrically connected to the two adjacent first electrodes and are located in the second peripheral area, and the another first peripheral wiring and the another second peripheral wiring of the two different peripheral wiring pairs located in the second peripheral area at least partially overlap.

5. The electronic device according to claim 1, wherein thicknesses of the first peripheral wiring and the second peripheral wiring of each of the peripheral wiring pairs are different.

6. An electronic device, comprising:
a substrate, having a first peripheral area, a working area, and a second peripheral area, wherein the first peripheral area, the working area, and the second peripheral area are arranged along a first direction, and the working area is located between the first peripheral area and the second peripheral area;
a plurality of first electrodes, disposed in the working area, structurally separated from each other, and arranged along a second direction, wherein the first direction and the second direction are interlaced;
a plurality of second electrodes, disposed in the working area, structurally separated from each other, and arranged along the first direction;
a plurality of peripheral wiring pairs, wherein each of the peripheral wiring pairs comprises a first peripheral wiring and a second peripheral wiring respectively belonging to a first conductive layer and a second conductive layer, one of the first peripheral wiring and the second peripheral wiring is disposed in one of the first peripheral area and the second peripheral area, other one of the first peripheral wiring and the second peripheral wiring is disposed in other one of the first peripheral area and the second peripheral area, and the first peripheral wiring and the second peripheral wiring are electrically connected to a same first electrode; and
an insulating layer, disposed between the first conductive layer and the second conductive layer, wherein
a plurality of first peripheral wirings and a plurality of second peripheral wirings of the peripheral wiring pairs are alternately arranged in the first peripheral area, the first electrodes belong to the first conductive layer, the insulating layer is disposed on the first conductive layer and has a plurality of contact windows, and each of the first electrodes is electrically connected to the second peripheral wiring of a corresponding peripheral wiring pair through a contact window of the insulating layer; and the contact windows of the insulating layer comprise a plurality of first contact windows and a plurality of second contact windows respectively located in the first peripheral area and the second peripheral area, the first contact windows correspond to odd-numbered first electrodes, and the second contact windows correspond to even-numbered first electrodes.

7. An electronic device, comprising:
a substrate, having a first peripheral area, a working area, and a second peripheral area, wherein the first peripheral area, the working area, and the second peripheral area are arranged along a first direction, and the working area is located between the first peripheral area and the second peripheral area;
a plurality of first electrodes, disposed in the working area, structurally separated from each other, and arranged along a second direction, wherein the first direction and the second direction are interlaced;
a plurality of second electrodes, disposed in the working area, structurally separated from each other, and arranged along the first direction;
a plurality of peripheral wiring pairs, wherein each of the peripheral wiring pairs comprises a first peripheral wiring and a second peripheral wiring respectively belonging to a first conductive layer and a second conductive layer, one of the first peripheral wiring and the second peripheral wiring is disposed in one of the first peripheral area and the second peripheral area, other one of the first peripheral wiring and the second peripheral wiring is disposed in other one of the first peripheral area and the second peripheral area, and the first peripheral wiring and the second peripheral wiring are electrically connected to a same first electrode; and
an insulating layer, disposed between the first conductive layer and the second conductive layer, wherein
a plurality of first peripheral wirings and a plurality of second peripheral wirings of the peripheral wiring pairs are alternately arranged in the first peripheral area, the substrate further has a third peripheral area located beside the first peripheral area, the working area, and the second peripheral area, the electronic device further comprising:
a plurality of pads, disposed in the third peripheral area, wherein each of the pads comprises a first conductive pattern, a second conductive pattern, and a metal oxide pattern that are stacked in order and electrically connected to each other, and the first conductive pattern and the second conductive pattern are structurally separated from the peripheral wirings; and the first conductive pattern and the second conductive pattern of each of the pads are electrically connected to the first peripheral wiring or the second peripheral wiring of a corresponding peripheral wiring pair through the metal oxide pattern.

\* \* \* \* \*